US008979245B2

(12) United States Patent
Nariai et al.

(10) Patent No.: US 8,979,245 B2

(45) Date of Patent: Mar. 17, 2015

(54) INK JET RECORDING APPARATUS AND RECORDED MATTER

(71) Applicant: Seiko Epson Corporation, Tokyo (JP)

(72) Inventors: Maki Nariai, Shiojiri (JP); Kinya Ozawa, Shiojiri (JP); Shinichi Itaya, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/848,287

(22) Filed: Mar. 21, 2013

(65) Prior Publication Data

US 2013/0250003 A1 Sep. 26, 2013

(30) Foreign Application Priority Data

Mar. 23, 2012 (JP) ................................. 2012-068218

(51) Int. Cl.

| | |
|---|---|
| ***B41J 2/15*** | (2006.01) |
| ***G01D 11/00*** | (2006.01) |
| ***B41J 2/135*** | (2006.01) |
| ***B41J 2/14*** | (2006.01) |

(52) U.S. Cl.

CPC .............. *B41J 2/135* (2013.01); *B41J 2/14233* (2013.01); *B41J 2202/11* (2013.01)

USPC ............................................. 347/40; 347/100

(58) Field of Classification Search

CPC .................................. B41J 2/1433; B41J 2/14

USPC ...................................................... 347/40, 47

See application file for complete search history.

(56) References Cited

U.S. PATENT DOCUMENTS

| | | | | |
|---|---|---|---|---|
| 5,723,053 | A | 3/1998 | Momose et al. | |
| 7,763,108 | B2 | 7/2010 | Oyanagi et al. | |
| 2001/0055049 | A1 * | 12/2001 | Isono et al. | 347/68 |
| 2009/0225135 | A1 * | 9/2009 | Suzuki | 347/47 |
| 2009/0231391 | A1 * | 9/2009 | Akahane | 347/47 |
| 2009/0244128 | A1 | 10/2009 | Ozawa et al. | |

(Continued)

FOREIGN PATENT DOCUMENTS

| | | |
|---|---|---|
| EP | 1 038 931 A1 | 9/2000 |
| JP | 08-025631 | 1/1996 |

(Continued)

OTHER PUBLICATIONS

Extended European Search Report for Application No. EP 13 15 9803 dated Jun. 20, 2013 (6 pages).

*Primary Examiner* — Matthew Luu
*Assistant Examiner* — Patrick King
(74) *Attorney, Agent, or Firm* — Harness, Dickey & Pierce, P.L.C.

(57) ABSTRACT

A recording apparatus includes a head, wherein a manifold in which an ink flows, and a plurality of ink flow paths divided from the manifold and arranged in a first direction are formed in the head; a nozzle opening portion discharging the ink flowing from the manifold is formed in the ink flow path; when a maximum area is C1 and a minimum area is C2 in a cross section of the ink flow path including the first direction and a vertical direction, except a cross section including the nozzle opening portion, the C1 is more than once and equal to or less than 3.5 times the C2; and the ink contains a flaky pigment having an average thickness of 5 nm or more and 50 nm or less and a 50% average particle diameter of an equivalent circle diameter of 0.5 μm or more and 2.1 μm or less.

16 Claims, 4 Drawing Sheets

(56) References Cited

U.S. PATENT DOCUMENTS

| | | | | |
|---|---|---|---|---|
| 2011/0063362 | A1* | 3/2011 | Takaori et al. | 347/21 |
| 2011/0074883 | A1* | 3/2011 | Ozawa | 347/47 |
| 2011/0181656 | A1* | 7/2011 | Oyanagi et al. | 347/20 |
| 2011/0279551 | A1 | 11/2011 | Lee et al. | |

FOREIGN PATENT DOCUMENTS

| | | |
|---|---|---|
| JP | 2002-210965 | 7/2002 |
| JP | 2005-059387 | 3/2005 |
| JP | 2008-091689 A | 4/2008 |
| JP | 2008-174712 | 7/2008 |

* cited by examiner

INK JET RECORDING APPARATUS AND RECORDED MATTER

Priority is claimed under 35 U.S.C. §119 to Japanese Application No. 2012-068218 filed on Mar. 23, 2012, which is hereby incorporated by reference in its entirety.

BACKGROUND

1. Technical Field

The present invention relates to an ink jet recording apparatus and a recorded matter obtained using the same.

2. Related Art

In the related art, there has been known a so-called ink jet recording apparatus which records images or letters with minute ink droplets discharged from nozzles of an ink jet recording head. In order to obtain a desired image using such an ink jet recording apparatus, recently, various kinds of ink jet recording inks to which various components are added depending on purposes have been used.

For example, an ink jet recording ink including an aluminum pigment satisfying a specific parameter to obtain an image having excellent metal glossiness is disclosed in JP-A-2008-174712.

Among the pigments included in the ink jet recording ink, a flaky pigment has a unique shape. Therefore, when an ink containing the flaky pigment is circulated in an ink flow path, the flaky pigment shows irregular behavior in the ink flow path to interrupt the circulation of the ink. Then, a flow rate of the ink is remarkably decreased, which causes a defect that the discharging stability of the ink is decreased in some cases. That is, a problem arises in that while an ink including an approximately spherical organic pigment having an average volume particle diameter of about 100 μm used in the related art can be discharged, the ink including the flaky pigment having a large particle diameter cannot be discharged in some cases.

in some cases, the defect may be remarkable particularly when an ink jet recording head which employs a piezo method and is provided with nozzles arranged in high density (for example, an ink jet recording head having nozzle resolution of equal to or more than 300 dpi) is used. That is, since a high density head employing the piezo method uses a piezoelectric element reduced in size in terms of the limitation of the structure thereof, the discharging force of the ink often becomes weak. Then, it is difficult to discharge the ink from the nozzle due to a synergy effect of the decrease in the flow rate of the ink and the weakening of the discharging force of the ink in some cases.

SUMMARY

An advantage of some aspects of the invention is to provide an ink jet recording apparatus having excellent discharging stability and a recorded matter obtained using the same.

The invention can be realized in the following forms or application examples.

Application Example 1

According to Application Example 1, there is provided a recording apparatus including: an ink jet recording head, wherein a manifold in which an ink flows, and a plurality of ink flow paths divided from the manifold and arranged in a first direction are formed in the ink jet recording head, a nozzle opening portion which discharges the ink flowing from the manifold is formed in the ink flow path, when a maximum area is C1 and a minimum area is C2 in a cross section of the ink flow path including the first direction and a vertical direction, except a cross section including the nozzle opening portion, the C1 is more than once and equal to or less than 3.5 times the C2, a length of the longest line segment is equal to or more than 30 μm and equal to or less than 80 μm among the line segments parallel to the first direction in the cross section of the ink flow path including the first direction and the vertical direction, the ink contains a flaky pigment, and the flaky pigment has an average thickness of equal to or more than 5 nm and equal to or less than 50 nm and a 50% average particle diameter of an equivalent circle diameter of equal to or more than 0.5 μm and equal to or less than 2.1 μm.

The recording apparatus according to Application 1 may favorably discharge the ink containing the flaky pigment having a specific 50% average particle diameter and average thickness.

Application Example 2

In the recording apparatus according to Application Example 1, ink supply paths which respectively communicate with the manifold and pressure generating chambers which respectively communicate with the ink supply paths may be formed in the plurality of the ink flow paths, and the number of the ink supply paths corresponding to the pressure generating chamber may be one.

Application Example 3

In the recording apparatus according to Application Example 1 or Application Example 2, the maximum particle diameter of the equivalent circle diameter of the flaky pigment may be equal to or less than 3 μm.

Application Example 4

In the recording apparatus according to any one of Application Example 1 to Application Example 3, when the equivalent circle diameter of the cross section of the nozzle opening portion orthogonal to an ink discharging direction is D1, and the 50% average particle diameter of the equivalent circle diameter of the flaky pigment is D2, D2 may be equal to or less than 0.1 time D1.

Application Example 5

In the recording apparatus according to any one of Application Example 1 to Application Example 4, a discharging rate of the ink droplets discharged from the nozzle opening portion may be equal to or more than 6 m/second.

Application Example 6

In the recording apparatus according to any one of Application Example 1 to Application Example 5, a resolution of the ink jet recording head may be equal to or more than 300 dpi.

Application Example 7

In the recording apparatus according to any one of Application Example 1 to Application Example 6, a piezoelectric actuator which has a vibration plate and a piezoelectric element may be formed in the ink jet recording head.

Application Example 8

In the recording apparatus according to Application Example 7, the piezoelectric element may be deformed in a flexural vibration manner.

Application Example 9

According to Application Example 9, there is provided a recorded matter which is obtained using the recording apparatus according to any one of Application Example 1 to Application Example 8.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be described below. The embodiments which will be described below are to describe an example of the invention. In addition, the invention is not limited to the following embodiments and also includes various modification examples modified within a range of not changing the scope of the invention.

Hereinafter, a preferred embodiment of a recording apparatus will be described in detail with reference to drawings.

1. Recording Apparatus 1.1. Apparatus Configuration

Figure 1:
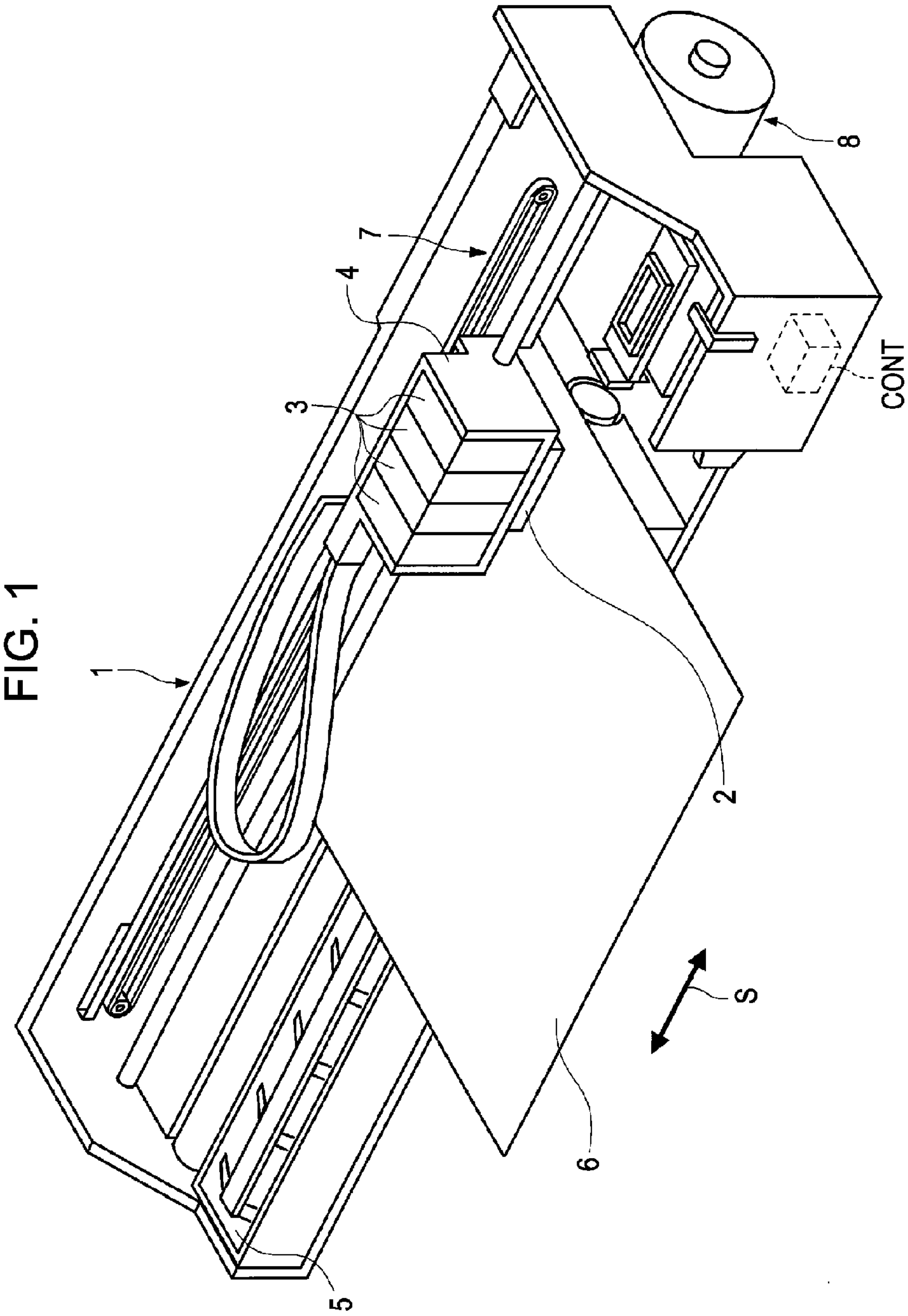
FIG. 1 is a perspective view showing a schematic configuration of a recording apparatus according to an embodiment of the invention.

As a recording apparatus according to an embodiment of the invention, for example, an ink jet printer (hereinafter, simply referred to as a "printer") as shown in FIG. 1 is exemplified. Here, the recording apparatus according to the invention is not limited to the embodiment below.

FIG. 1 is a perspective view showing a schematic configuration of the recording apparatus (printer 1) according to the embodiment.

As shown in FIG. 1, the printer 1 includes a carriage 4 on which an ink jet recording head 2 (hereinafter, simply referred to as a "head 2") is mounted and to which an ink cartridge 3 is detachably attached, a platen 5 which is disposed below the head 2 and to which a recording medium 6 is transported, a carriage moving mechanism 7 which moves the carriage 4 in a width direction (main scanning direction S) of the recording medium 6, and a medium feeding mechanism which transports the recording medium 6 in a medium feeding direction. In addition, the printer 1 has a control unit CONT which controls the overall operations of the printer 1.

The ink cartridge 3 is made up of plural independent cartridges and each cartridge is filled with ink.

As the printer 1 according to the embodiment, a so-called on-carriage type printer on which the ink cartridge 3 is mounted on the carriage 4 is exemplified, and there is no limitation thereto. For example, the printer may be a so-called off cartridge type printer in which a container filled with ink (for example, an ink pack and an ink cartridge) is attached to a case of the printer 1 and the ink is supplied to the head 2 through an ink supply tube.

Figure 2:
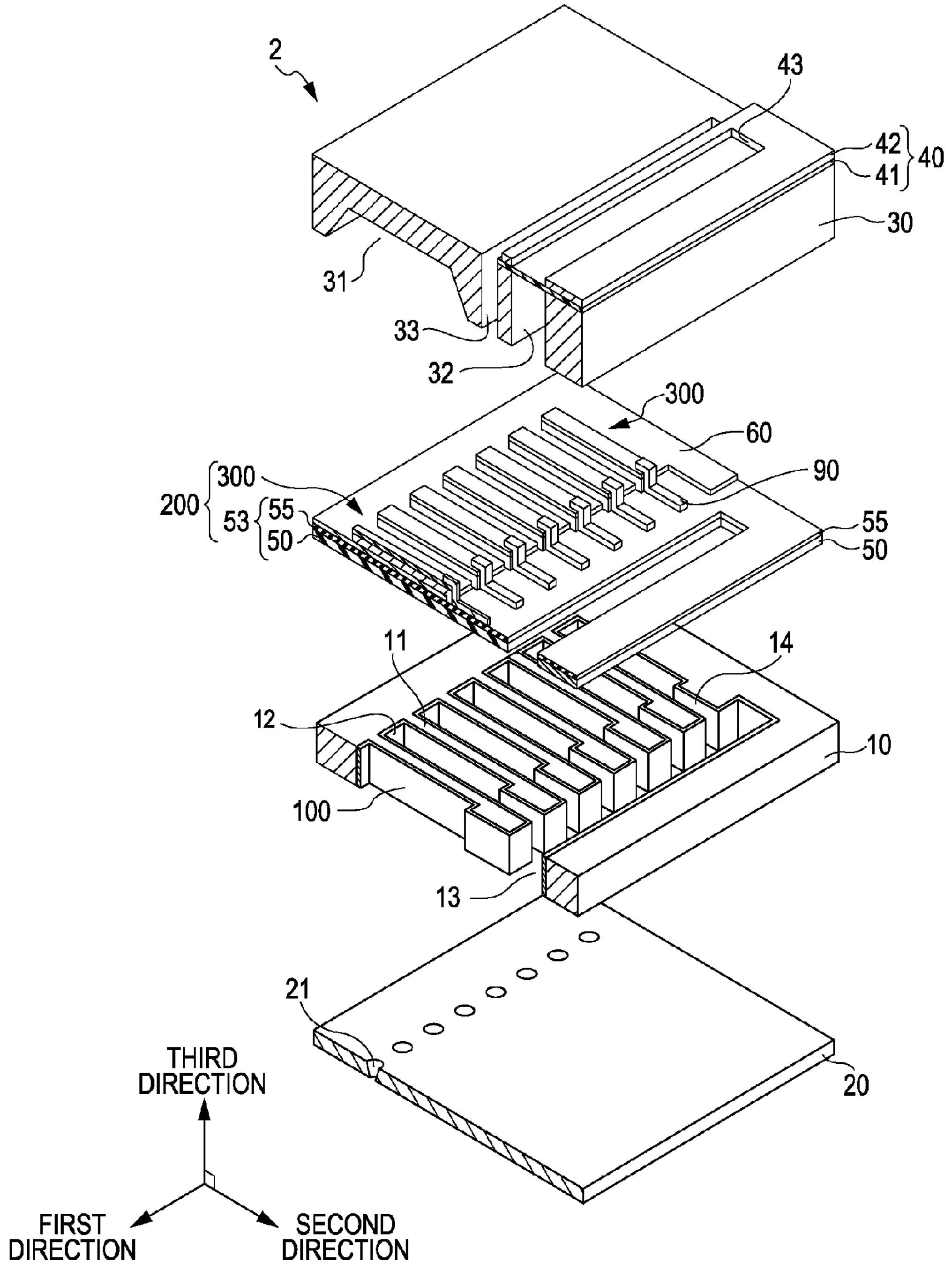
FIG. 2 is an exploded perspective view showing a schematic configuration of an ink jet recording head according to the embodiment of the invention.
Figure 3A:
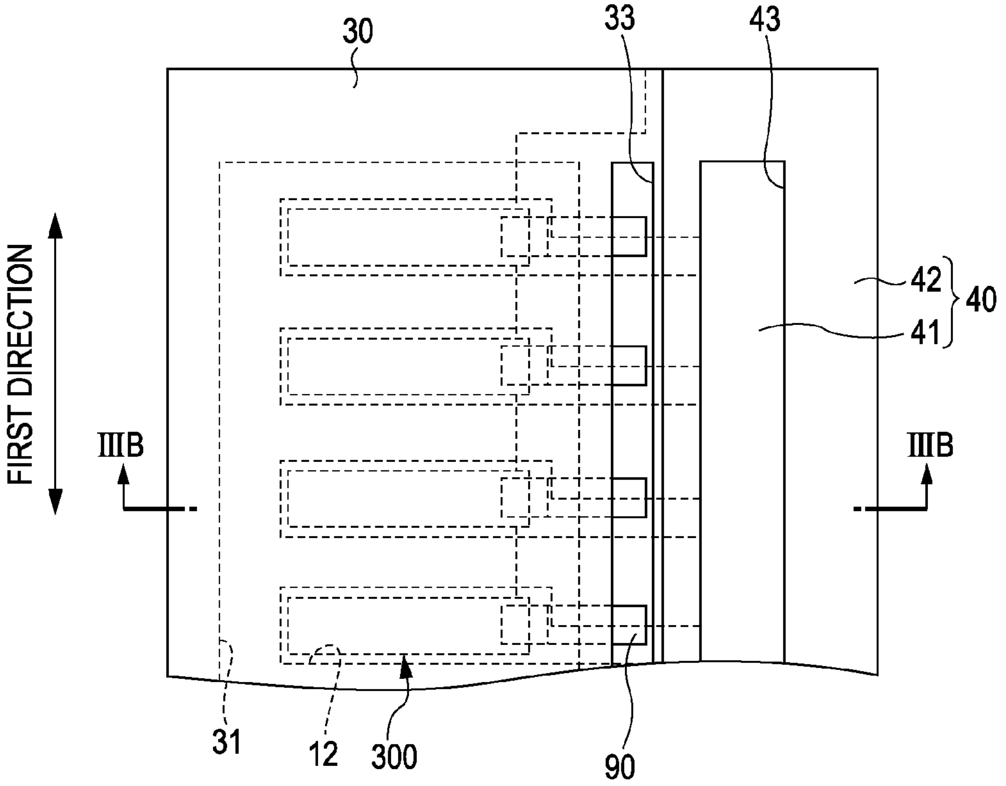
FIG. 3A is a partial plan view and FIG. 3B is a partial cross-sectional view of the ink jet recording head according to the embodiment of the invention.
Figure 3B:
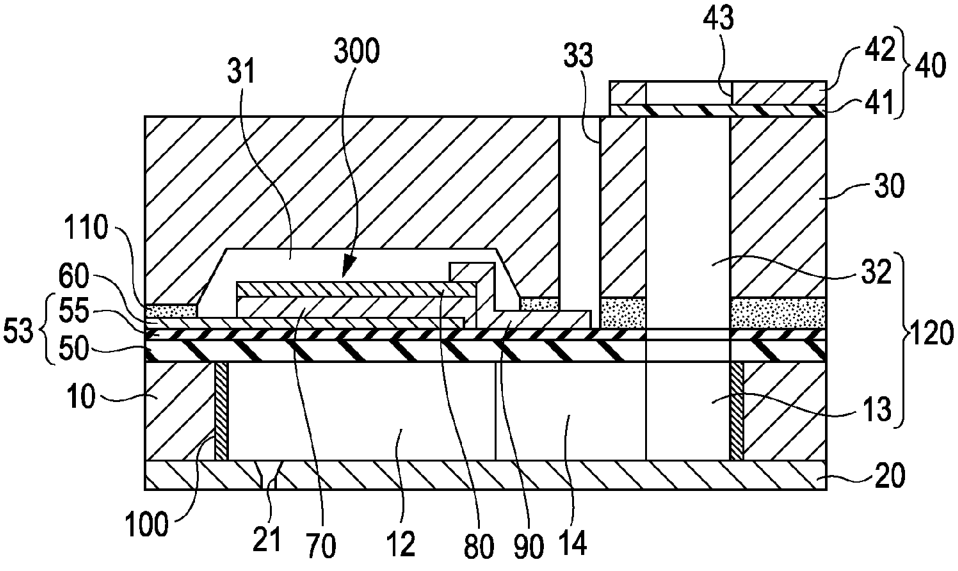
Figure 4:
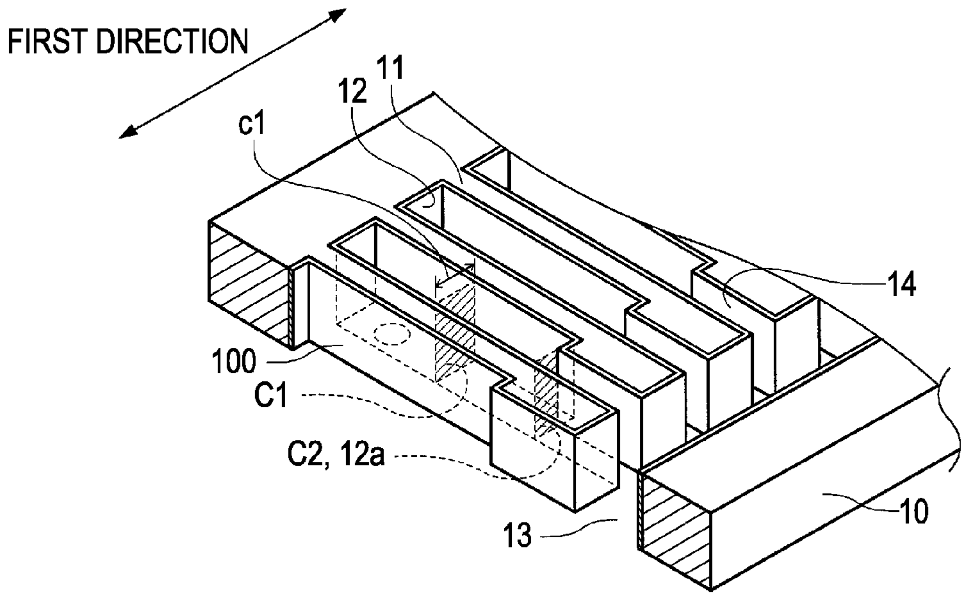
FIG. 4 is a partial perspective view of a flow path forming substrate in the ink jet recording head according to the embodiment of the invention.

FIG. 2 is an exploded perspective view showing a schematic configuration of the head 2, FIG. 3A is a partial plan view of the head 2, and FIG. 3B is a cross-sectional view taken along line IIIB-IIIB of FIG. 3A. In addition, FIG. 4 is a partial perspective view of a flow path forming substrate 10.

In an example of FIG. 2, the head 2 has the flow path forming substrate 10, a nozzle plate 20, a piezoelectric actuator 200 and a protection substrate 30.

The flow path forming substrate 10 forms a flow path in which the ink circulates. The flow path forming substrate 10 is made of a silicon single crystal substrate having a plane orientation (110).

Flow Path Forming Substrate

The flow path forming substrate 10 is provided with spaces of pressure generating chambers 12, a communication chamber 13 and ink supply paths 14 due to the assembly of the head 2. The spaces of the pressure generating chambers 12, the communication chamber 13 and the ink supply paths 14 are obtained, for example, by etching the flow path forming substrate 10 using a well-known etching unit to pass through the flow path forming substrate. Here, the ink flow path according to the embodiment corresponds to the pressure generating chamber 12, the ink supply path 14 and a nozzle opening portion 21 (which will be described later) in the examples in FIGS. 2 to 4.

The plural pressure generating chambers 12 are arranged in a first direction and is partitioned by compartment walls 11. Moreover, the pressure generating chamber 12 is provided with an ink supply port 12*a* shown in FIG. 4. In the examples in FIGS. 2 to 4, the pressure generating chamber 12 has a rectangular parallelepiped shape extending in a direction orthogonal to the first direction (a second direction in FIG. 2), and there is no limitation thereto. For example, the pressure generating chamber may be a parallelepiped or a trapezoidal column. The volume of the pressure generating chamber 12 is changed by the flexural deformation of the piezoelectric actuator 200 which will be described later.

The plural ink supply paths 14 are arranged in the first direction and is partitioned by the compartment walls 11. One side of the ink supply path 14 communicates with the pressure generating chamber 12 through the ink supply port 12*a*, and the other side of the ink supply path 14 communicates with the communication chamber 13.

As shown in FIGS. 2 to 4, it is preferable that one ink supply path 14 correspond to one pressure generating chamber 12. In other words, it is preferable that the ink supply port 12*a* provided in the pressure generating chamber 12 be one from the viewpoint of high density in the head 2 (nozzle opening portions 21). In addition, when the ink supply path is one, while a problem of discharging stability easily arises, the problem can be favorably solved by application of the embodiment.

Moreover, in the examples in FIGS. 2 and 4, the ink supply port 12*a* (ink supply path 14) is provided to be biased on one side of the first direction in a cross section of the pressure generating chamber 12 including the first direction and a vertical direction, and there is no limitation thereto. For example, the ink supply port 12*a* (ink supply path 14) may be provided in the center portion of the first direction in the cross section of the pressure generating chamber 12 including the first direction and the vertical direction.

The communication chamber 13 is a region outside the pressure generating chamber 12, and is provided in the first direction. The communication chamber 13 communicates with the pressure generating chamber 12 through the ink supply path 14 provided in each pressure generating chamber 12. That is, the ink flowing in the communication chamber 13 is divided into each ink supply path 14 and flows in the pressure generating chamber 12 from the ink supply port 12*a*, through the ink supply path 14.

In addition, the communication chamber 13 communicates with the protection substrate 30 and forms a manifold 120 which is a common ink chamber of each of the pressure generating chambers 12.

As shown in FIG. 1, a protective film 100 may be provided on the surface of the pressure generating chamber 12, the ink supply path 14 and the communication chamber 13 of the flow path forming substrate 10 to reduce corrosion by the ink. As for the material of the protective film 100, for example, there may be nitride films such as silicon nitride and oxide films such as tantalum oxide and aluminum oxide.

In the ink jet recording head according to the embodiment, the longest line segment has a length of equal to or more than 30 μm and equal to or less than 80 μm among the line segments parallel to the first direction in the cross section of the ink flow path including the first direction and the vertical direction, preferably equal to or more than 30 μm and equal to or less than 70 μm, and more preferably equal to or more than 40 μm and equal to or less than 60 μm. Specifically, as shown in FIG. 4, a length of a line segment c1 parallel to the first direction in the cross section of the pressure generating chamber 12 including the first direction and the vertical direction is equal to or more than 30 μm and equal to or less than 80 μm, preferably equal to or more than 30 μm and equal to or less than 70 μm, and more preferably equal to or more than 40 μm and equal to or less than 60 μm in the head 2 according to the embodiment. Since the length of the line segment is equal to or less than 80 μm and the nozzle opening portions 21 corresponding to the pressure generating chambers 12 are arranged in high density, a high resolution image can be recorded. Meanwhile, since discharge is difficult in comparison with a head in the related art, it is preferable to apply the embodiment. When the length of the line segment is less than 30 μm, a sufficient amount of discharged droplets cannot be secured and a good metallic image cannot be obtained in some cases. In an ink jet head disclosed in JP-A-2008-174712 as the related art, the longest line segment among line segments parallel to a first direction in a cross section of an ink flow path including the first direction and an vertical direction is equal to or more than 100 μm.

In the ink jet recording head according to the embodiment, when the maximum area is C1, and the minimum area is C2 in the cross section of the ink flow path including the first direction and the vertical direction, except a cross section including the nozzle opening portion, the C1 is more than once and equal to or less than 3.5 times the C2, preferably equal to or more than 1.5 times and equal to or less than 3 times, and more preferably equal to or more than twice and equal to or less than 2.5 times. Specifically, when a cross section area of the pressure generating chamber 12 including the first direction and the vertical direction is C1, and a cross section area of the ink supply port 12*a* (or the ink supply path 14) including the first direction and the vertical direction is C2 in the head 2 according to the embodiment, C1/C2 is more than once and equal to or less than 3.5 times, preferably equal to or more than 1.5 times and equal to or less than 3 times, and more preferably equal to or more than twice and equal to or less than 2.5 times. Since the relationship of the cross section area is in the above range, a discharging rate of the ink can be secured sufficiently in a case of using the ink containing a flaky pigment having a specific average thickness and 50% average particle diameter, which will be described later, so that discharging stability is good.

On the other hand, when the relationship of the cross section area is more than 3.5 times, the flow rate of the ink flowing into the pressure generating chamber 12 from the ink supply port 12*a* is rapidly decreased, and thereby, the discharging rate of the ink is decreased. The detailed reason thereof is unclear, and it is considered that the flow of the ink is turbulent and a pressure loss is increased so that the flow rate of the ink is rapidly decreased. In addition, when the relationship of the cross section area is equal to or less than once, a defect occurs that the ink flowing into the pressure generating chamber 12 from the ink supply port 12*a* flows back to the ink supply path 14 in some cases.

Nozzle Plate

The nozzle plate 20 is fixed on one surface of the flow path forming substrate 10 by an adhesive layer 110 (refer to FIG. 3B) made of an adhesive or a thermal welding film.

The plural nozzle opening portions 21 are drilled in the nozzle plate 20 in the first direction. For example, the nozzle plate 20 is made of glass ceramics, a silicon single crystal substrate, stainless steel or the like. Among the examples, the nozzle plate is preferably made of a silicon single crystal substrate from the viewpoint of arranging the nozzle opening portions in high density.

The nozzle opening portions 21 are provided to communicate with each of the pressure generating chambers 12. The number of the nozzle opening portions 21 is preferably equal to or more than 300 per inch (vertically or horizontally) in the first direction (that is, vertical or horizontal nozzle resolution is respectively equal to or more than 300 dpi), and more preferably equal to or more than 360 per inch. Since the nozzle resolution (vertically or horizontally) is equal to or more than 300 dpi, a high quality image is obtained. Meanwhile, in case of the high density ink jet recording head, while a problem of discharging stability easily arises, good discharging stability can be obtained by application of the embodiment.

The shape of the nozzle opening portion 21 is not particularly limited and, examples of the shape include a column shape (for example, a cylindrical shape, a circular truncated cone shape, a polygonal shape and an elliptical cylindrical shape) extending in an ink discharging direction and the combination shape thereof having different volumes. Among the examples, the cylindrical shape, the circular truncated cone shape and the combination shape thereof are preferable.

When an equivalent circle diameter of the cross section of the nozzle opening portion 21 orthogonal to the ink discharging direction is D1, and the 50% average particle diameter of the flaky pigment, which will be described later, is D2, D2 is preferably equal to or less than 0.1 time D1, and more preferably equal to or less than 0.05 times. When the relationship is equal to or less than 0.1 time, discharging stability of the ink is further improved in some cases.

In the embodiment, the equivalent circle diameter of the cross section of the nozzle opening portion orthogonal to the ink discharging direction refers to a diameter of a circle in a case of the circle having the cross section area. In addition, the D1 refers to the smallest diameter among the equivalent circle diameters of the cross sections of the nozzle opening portions 21 orthogonal to the ink discharging direction.

Moreover, the equivalent circle diameter D1 of the cross section of the nozzle opening portion 21 orthogonal to the ink discharging direction is preferably equal to or more than 5 μm and equal to or less than 40 μm, and more preferably equal to or more than 15 μm and equal to or less than 25 μm. When the D1 is in the above range, the discharging stability of the ink containing the flaky pigment having the specific average thickness and 50% average particle diameter, which will be described later, can be further improved in some cases.

The shape of the cross section of the nozzle opening portion orthogonal to the ink discharging direction may be any shape, for example, a circular shape, an elliptical cylindrical shape and a polygonal shape and the circular shape or the elliptical cylindrical shape is preferable from the viewpoint of controlling clogging of ink. In the examples in FIGS. 2 and 4, the shape of the cross section of the nozzle opening portion orthogonal to the ink discharging direction is circular.

The ink supplied to the pressure generating chamber is discharged from the nozzle opening portion 21. At this time, the discharging rate of the ink droplet discharged from the nozzle opening portion 21 is preferably equal to or more than 6 m/second, more preferably equal to or more than 8 m/second, and particularly preferably equal to or more than 10 m/second. When the discharging rate of the ink droplet is equal to or more than 6 m/second, the discharging stability of the ink containing the flaky pigment having the specific average thickness and 50% average particle diameter, which will be described later, can be further improved in some cases.

Moreover, in the case in which there is the ink containing the flaky pigment and the ink containing a pigment other than the flaky pigment, when a deformation amount of the pressure generating chamber 12 discharging the ink containing the flaky pigment is increased more than a deformation amount of the pressure generating chamber 12 discharging the ink containing a pigment other than the flaky pigment and recording is performed, the discharging stability of both is improved, which is preferable. The deformation amount of the pressure generating chamber can be adjusted, for example, by changing a driving voltage of the piezoelectric element.

For example, the discharging rate of the droplet can be measured by the ink jet droplet measuring equipment (product name "JetMeasure", manufactured by MICROJET). The droplet to be discharged one by one from the nozzle is divided into plural droplets in some cases while being separated from the nozzle or flying. In this case, the droplet having the largest amount (pl) is set as a reference among the divided plural droplets. In addition, the time when the droplets fly means from the time when the droplets are discharged from the nozzle and to the time when the droplets adhere to (contact) the recording medium.

Piezoelectric Actuator

The piezoelectric actuator 200 is provided on the other surface (that is, the surface opposite to the surface on which the nozzle plate is provided) of the flow path forming substrate 10. The piezoelectric actuator 200 includes a vibration plate 53 and a piezoelectric element 300 which is a driving unit.

The vibration plate 53 includes an elastic film 50 (for example, which has a thickness of approximately 1.0 μm and is made of silicon nitride and the like) and an insulator film 55 formed on the elastic film 50 (for example, which has a thickness of approximately 0.35 μm and is made of zirconium oxide and the like).

The piezoelectric element 300 is formed in a region facing the pressure generating chamber 12 through the vibration plate 53. Specifically, a piezoelectric body active portion (a portion that has piezoelectric distortion formed by applying a voltage to an upper electrode 80 and a lower electrode 60) may be formed for each pressure generating chamber 12.

The piezoelectric element 300 which has the lower electrode 60 (for example, thickness of approximately 0.1 to 0.2 μm), a piezoelectric layer 70 (for example, a thickness of approximately 0.2 to 5 μm) and the upper electrode 80 (for example, a thickness of approximately 0.05 μm) is formed on the insulator film 55.

Materials such as platinum, iridium, and alloys thereof can be used for the lower electrode 60. Materials of metals such as aluminum, gold, nickel, platinum, iridium, and alloys thereof, conductive oxides, and the like can be used for the upper electrode 80. The piezoelectric layer 70 is not particularly limited to the materials and, for example, lead zirconate titanate materials can be used.

In general, any one electrode of the piezoelectric element 300 is used as a common electrode, and the other electrode and the piezoelectric layer 70 are formed by patterning for each pressure generating chamber 12. In the embodiment, the lower electrode 60 is used as a common electrode of the piezoelectric element 300, and the upper electrode 80 is used as an individual electrode of the piezoelectric element 300. However, when these are reversed on account of a drive circuit and wiring, there is no problem.

In addition, the piezoelectric actuator 200 includes lead electrodes 90. The lead electrodes 90 made of, for example, gold (Au), are respectively connected to the upper electrode 80 of each piezoelectric element 300 so that a voltage can be selectively applied to each piezoelectric element 300 through the lead electrodes 90.

Protection Substrate

The protection substrate 30 has a piezoelectric element holding portion 31 to protect the piezoelectric element 300, and is joined to a region facing the piezoelectric element 300 with an adhesive and the like.

As long as a space sufficient enough so as not to inhibit the movement of the piezoelectric elements 300 is secured, the space of the piezoelectric element holding portion 31 may be sealed or may not be sealed.

A reservoir portion 32 is provided in the protection substrate 30, in a region facing the communication chamber 13, and the reservoir portion 32 is made to communicate with the communication chamber 13 of the flow path forming substrate 10 to form the manifold 120, which serves as an ink chamber common to each pressure generating chamber 12.

A penetrated hole 33 penetrating the protection substrate 30 in the thickness direction thereof is provided in a region between the piezoelectric element holding portion 31 of the protection substrate 30 and the manifold 120, and a part of the lower electrode 60 and a tip end of the lead electrode 90 are exposed in the penetrated hole 33. One end of a connection wire extended from a drive IC (not shown) is connected to the lower electrode 60 and the lead electrode 90.

The protection plate 30 is made of a material having almost the same thermal expansion coefficient as that of the flow path forming substrate 10, for example, glass, a ceramic material, or a silicon single crystal substrate.

A compliance substrate 40 including a sealing film and a fixing plate 42 is joined on the protection substrate 30. Here, the sealing film 41 is made of a flexible material with low rigidity, for example, a polyphenylene sulfide (PPS) film (for example, a thickness of 6 μm), and one side of the reservoir portion 32 is sealed with the sealing film 41.

The fixing plate 42 is made of a hard material such as metal, for example, stainless steel (SUS) or the like with a thickness of 30 μm. Since a region of the fixing plate 42 facing the manifold 120 is an opening portion 43 where the fixing plate 42 is completely removed in the thickness direction thereof, one side of the manifold 120 is sealed with only the sealing film 41 having flexibility.

Ink Discharge Mechanism

In the head 2, after ink is supplied from an ink supply unit, and the inside from the manifold 120 to the nozzle opening portion 21 is filled with the ink, in accordance with record signals from the drive IC, a voltage is respectively applied between the lower electrode 60 and the upper electrode 80 corresponding to each pressure generating chamber 12. The elastic film 50 and the piezoelectric layer 70 are deformed in a flexural manner (vibrated in a flexural manner), pressure in each pressure generating chamber 12 is increased, and ink droplets are ejected from the nozzle opening portions 21. In this manner, ink adheres to the recording medium to obtain a recorded matter on which an image is recorded.

1.2. Ink

Next, an ink used in the recording apparatus according to the embodiment will be described in detail.

1.2.1. Flaky Pigment

The ink used in the recording apparatus according to the embodiment contains the flaky pigment. In the embodiment, the “flaky pigment” refers to a pigment having an almost flat surface (X-Y plane) when a longitudinal diameter is X, a lateral diameter is Y, and the thickness is Z on the plane surface of the flaky pigment, and made of particles having an even thickness (Z). For example, the flaky shape includes a scale-like shape, a leaf shape, a plate-like shape, and the like.

The flaky pigment according to the embodiment has the 50% average (median) particle diameter D2 (hereafter, also simply referred to as “D2”) of the equivalent circle diameter, which is obtained from the area of the almost flat surface (X-Y plane) of the flaky pigment, of equal to or more than 0.5 μm and equal to or less than 2.1 μm, and an average thickness (Z) of equal to or more than 5 nm and equal to or less than 50 nm. When D2 and the average thickness of the flaky pigment is in the above range, discharging stability is excellent in application to the above-described recording apparatus. On the other hand, when D2 is more than 2.1 μm, the ink flow rate is decreased in the ink flow path of the above-described recording apparatus and the ink cannot be discharged in some cases. When a glitter pigment described later is used as the flaky pigment and D2 is less than 0.5 μm, a sufficient glossiness (glitter) cannot be obtained in some cases.

As for the flaky pigment according to the embodiment, D2 is preferably equal to or more than 0.5 μm and equal to or less than 1.5 μm. Since D2 is in the above range, discharging stability becomes better in the application to the above-described recording apparatus.

The maximum particle diameter of the equivalent circle diameter which is obtained from the area of the almost flat surface (X-Y plane) of the flaky pigment is preferably equal to or less than 3 μm. Since the maximum particle diameter of the flaky pigment is equal to or less than 3 μm, it is possible to effectively suppress clogging from occurring in the nozzle opening portion and the ink flow path in the recording apparatus.

The longitudinal diameter X, the lateral diameter Y, and the equivalent circle diameter on the plane surface of the flaky pigment can be measured using a particle image analyzer. For example, a flow type particle image analyzer FPIA-2100, FPIA-3000, or FPIA-30005 (manufactured by Sysmex Corporation) can be used as the particle image analyzer. The average particle diameter and the maximum particle diameter of the equivalent circle diameter are calculated based on measurement values.

The particle distribution (CV value) of the plate-like particles can be obtained by the following equation (1).

$$CV \text{ value} = \text{standard deviation of particle size distribution} / \text{average particle diameter} \times 100 \quad (1)$$

Here, the obtained CV value is preferably equal to or less than 60, more preferably equal to or less than 50, and particularly preferably equal to or less than 40. The effect that the recording stability is excellent can be obtained by selecting a flaky pigment in which the CV value is equal to or less than 60.

Moreover, as for the flaky pigment according to the embodiment, the average (mean) thickness (Z) is preferably equal to or more than 10 nm and equal to or less than 30 nm, and more preferably equal to or more than 10 nm and equal to or less than 25 nm. Since the average thickness (Z) is in the above range, discharging stability becomes better in the application to the above-described recording apparatus. For example, the thickness (Z) can be observed using a transmission electron microscope and a scanning electron microscope, and specific examples include a transmission electron microscope (TEM, JOEL JEM-2000EX), a field emission scanning electron microscope (FE-SEM, Hitachi S-4700), a scanning transmission electron microscope (STEM, “HD-2000” manufactured by Hitachi High-Technologies Corporation) and the like. The thickness (Z) means an average thickness and is an average value obtained such that the measurement is performed 10 times.

As long as the average particle diameter and the average thickness are satisfied, there is no particular limitation to the flaky pigment and, for example, a glitter pigment, a well-known organic pigment and inorganic pigment and the like can be used. Among the examples, the glitter pigment is preferable from the viewpoint of ease of processing into a flaky shape.

As long as glitter is shown when the pigment adheres to the medium, there is no particular limitation thereto, and examples of the glitter pigment include single ones or an alloy of two or more kinds thereof (also referred to as a metallic pigment) selected from a group consisting of aluminum, silver, gold, platinum, nickel, chromium, tin, zinc, indium, titanium, copper, or the like, and a pearl pigment having pearl gloss. Typical examples of the pearl pigment include pigments having pearlescent gloss or interference gloss, such as mica coated with titanium dioxide, fish scale foil, bismuth oxychloride, and the like. The glitter pigment may be subjected to a surface treatment to suppress reaction with water. An image having an excellent glitter can be formed by containing the glitter pigment in the ink. Among the glitter pigments, the metallic pigment is preferable from the viewpoint of ease of processing into a flaky shape.

In the specification, for example, the glitter refers to properties defined by mirror surface glossiness of an obtained image (refer to Japanese Industrial Standard (JIS) Z8741). For example, as kinds of the glitter, there are, glitter to mirror-reflect light, glitter of a so-called mat tone and the like, and the glossiness can be determined by a low level or a high level of the mirror surface glossiness.

The content of the flaky pigment is preferably equal to or more than 0.5% by mass and equal to or less than 30% by mass with respect to a total mass of ink, more preferably equal to or more than 1.0% by mass and equal to or less than 15% by mass, and particularly preferably equal to or more than 1% by mass and equal to or less than 5% by mass. When the content of the flaky pigment is in the above range, the ink has excellent preservation stability.

A method for producing the flaky pigment is not particularly limited, and can be produced using a well-known producing method. An example of the producing method using an aluminum pigment as the flaky pigment is shown below.

First, a composite pigment base material having a structure such that a resin layer for peeling and an aluminum or aluminum alloy layer (hereafter, simply referred to as an "aluminum layer") are successively laminated on a sheet-shaped base material is prepared. The aluminum layer can be formed by a vacuum deposition method, an ion plating method, or a sputtering method.

Next, the composite pigment base material is immersed in an organic solvent, an interface between the sheet-shaped base material and the resin layer for peeling is defined as a boundary, the aluminum layer is peeled from the composite pigment base material, crushed, and pulverized thereby obtaining an aluminum pigment dispersed liquid containing coarse particles. An aluminum pigment dispersed liquid containing the flaky aluminum pigment can be obtained by filtering the aluminum pigment dispersed liquid to remove the coarse particles.

A method for performing a peeling treatment from sheet-shaped base material is not particularly limited, and there are methods including immersing the composite pigment base material into a liquid, and a method including performing ultrasonic treatment simultaneously with immersion into a liquid, and then performing a peeling treatment and pulverizing treatment of the peeled composite pigment.

1.2.2. Other Components

The ink according to the embodiment can further contain organic solvents, resins, polyhydric alcohols, surfactants, water, and the like. The ink according to the embodiment may have water or an organic solvent as a main solvent (for example, a solvent of equal to or more than 50% by mass with respect to the total mass of ink).

Organic Solvent

Examples of the organic solvents include glycol ethers, monovalent alcohols and lactones. The organic solvent can be used as the solvent of the ink.

Examples of the glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

Examples of the monovalent alcohols include water-soluble alcohols such as methanol, ethanol, n-propyl alcohol, iso-propyl alcohol, 2,2-dimethyl-1-propanol, n-butanol, 2-butanol, tert-butanol, iso-butanol, 2-methyl-1-butanol, 3-methyl-1-butanol, 3-methyl-2-butanol, n-pentanol, 2-pentanol, 3-pentanol, and tert-pentanol.

Examples of the lactones include γ-butyrolactone, σ-valerolactone, and ϵ-caprolactone.

Resin

Examples of the resins include a well-known resins such as acrylic resins, styrene-acrylic resins, fluorene resins, urethane resins, polyolefin resins, rosin-modified resins, terpene resins, polyester resins, polyamide resins, epoxy resins, vinyl chloride resins, vinyl chloride-vinyl acetate copolymers, ethylene vinyl acetate resins, and cellulose resins (for example, cellulose acetate butyrate and hydroxypropyl cellulose), and polyolefin waxes. The resins can be used singly or in combination of two or more kinds. The resins can improve fixing properties to the recording medium and abrasion resistance of the ink, or improve dispersion properties of the flaky pigment in the ink.

Polyhydric Alcohol

Examples of the polyhydric alcohols include diethylene glycol, triethylene glycol, polyethylene glycol, polypropylene glycol, diproplylene glycol, 1, 2, 6-hexantriol, thioglycol, glycerin, trimethylolethane, and trimethylolpropane. When the ink is discharged from the nozzle of the ink jet recording apparatus, a function of the polyhydric alcohols is to reduce clogging of the nozzle.

Surfactant

The surfactant can be used to appropriately maintain ink surface tension and interfacial tension between the ink and the printer member such as the nozzle in contact with the ink. Due to this, the discharging stability of the ink can be improved. Moreover, the surfactant has an effect that the ink evenly spreads on the recording medium.

As the surfactant having such an effect, nonionic surfactants can be preferably used. Among the nonionic surfactants, the use of at least one of a silicone-based surfactant and an acetylene glycol-based surfactant is preferable.

Preferred examples of the silicone-based surfactant are polysiloxane-based compounds such as polyether modified organosiloxanes. Specific examples of the silicone-based surfactant are BYK-306, BYK-307, BYK-333, BYK-341, BYK-345, BYK-346, BYK-348, BYK-UV3500, BYK-UV3570, BYK-UV3510, BYK-UV3530 (all of which are names of products manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of which are names of products manufactured by Shin-Etsu Chemical Co., Ltd.).

Examples of the acetylene glycol-based surfactant include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (all of which are names of products manufactured by Air Products and Chemicals, Inc.); OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (all of which are names of products manufactured by Nissin Chemical Industry Co., Ltd.); ACETYLENOL E00, E00P, E40, and E100 (all of which are names of products manufactured by Kawaken Fine Chemicals Co., Ltd.).

As other surfactants other than the above-described surfactants, an anionic surfactant, a nonionic surfactant, an ampholytic surfactant and the like may be added.

Water

The ink according to the embodiment may be a water-based ink or a non-water-based ink. In the case of the water-based ink, pure water or extra-pure water, such as ion exchanged water, ultra-filtered water, reverse osmosis water and distilled water is preferably used. In particular, water obtained through a sterilization treatment, such as ultraviolet ray irradiation and addition of hydrogen peroxide, of these types of water is preferred since growth of fungus and bacteria can be suppressed for a long time.

Other Additive Components

The ink according to the embodiment may further contain an additive component such as a pH adjusting agent, a preservative and a fungicide, a rust inhibitor, or a chelating agent. When the ink contains these compounds, properties thereof may be further improved.

Examples of the pH adjusting agent include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium acid carbonate.

Examples the preservative and the fungicide include sodium benzoate, sodium pentachlorophenol, sodium 2-pyridinethiol-1-oxide, sodium sorbate, sodium dehydroacetate, and 1,2-dibenzynethiazoline-3-one. Commercially available products of the preservative and the fungicide are, for example, Proxel XL2, Proxel GXL (both of which are names of products manufactured by Avecia Limited); Denicide CSA, and NS-500W (both of which are names of products manufactured by Nagase ChemteX Corporation).

An example of the rust inhibitor is benzotriazole.

Examples of the chelating agent include ethylenediaminetetraacetic acid and salts thereof (dihydrogen disodium ethylenediaminetetraacetate and the like).

1.2.3. Physical Properties

The ink according to the embodiment preferably has a surface tension of equal to or more than 20 mN/m and equal to or less than 50 mN/m and more preferably equal to or more than 25 mN/m and equal to or less than 40 mN/m at 20° C., from the viewpoint of the balance between the recording quality and the reliability of an ink for ink jet. The surface tension thereof can be measured in such a manner that the ink is applied to a platinum plate to check the surface tension at 20° C. using an automatic surface tensiometer CBVP-Z (manufactured by Kyowa Interface Science Co., Ltd.).

From the same viewpoint, the ink composition according to the embodiment preferably has a viscosity of equal to or more than 2 mPa·s and equal to or less than 15 mPa·s, more preferably equal to or more than 2 mPa·s and equal to or less than 10 mPa·s at 20° C., and particularly preferably equal to or more than 2 mPa·s and equal to or less than 4.5 mPa·s. When the viscosity is in a rage of equal to or more than 2 mPa·s and equal to or less than 4.5 mPa·s, an appropriate flow rate and discharging rate is easily secured even in such a high density head according to the embodiment so that an ink containing a specific flaky pigment can be favorably discharged. The viscosity thereof can be measured in such a manner that the shear rate thereof is increased from 10 to 1000 at 20° C., using a rheometer MCR-300 (manufactured by Anton Paar) and the viscosity is read at a shear rate of 200.

2. Examples

Hereinafter, the invention is further described in detail with reference to Examples and Comparative Examples. However, the invention is not limited to the Examples.

2.1. Ink Preparation 2.1.1. Preparation of Flaky Pigment Dispersed Liquid

A resin layer coating liquid containing 3.0% by weight of cellulose acetate butyrate (butyration degree: 35% to 39%, manufactured by Kanto Chemical Co., Inc.) and 97% by weight of diethylene glycol diethyl ether (manufactured by Nippon Nyukazai Co., Ltd.) was evenly applied on a PET film having a thickness of 100 μm by a bar code method. Then, the coating was dried at 60° C. for 10 minutes to form a resin layer thin film on the PET film.

Subsequently, a vapor-deposited aluminum layer having an average thickness of 20 nm was formed on the resin layer using a vacuum vapor deposition apparatus (VE-1010 vacuum vapor deposition apparatus manufactured by VACUUM DEVICE INC.).

Then, the multilayer composite formed using the above method was simultaneously subjected to peeling, pulverization and dispersion in diethylene glycol diethyl ether using an ultrasonic dispersion apparatus VS-150 (manufactured by AS ONE Corporation), and thus a flaky pigment dispersed liquid was prepared. The flaky pigment dispersed liquid had been subjected to ultrasonic dispersion for a total of 12 hours.

The flaky pigment dispersed liquid was filtered through a SUS mesh filter with an opening of 5 μm to remove coarse particles. Subsequently, the filtrate was placed in a round bottom flask, and diethylene glycol diethyl ether was evaporated using a rotary evaporator. Thus the flaky pigment dispersed liquid was concentrated, and then the concentration of the flaky pigment dispersed liquid was adjusted to obtain a flaky pigment dispersed liquid A containing 5% by mass of flaky pigment.

In addition, flaky pigment dispersed liquids B to D were obtained in the same manner as the flaky pigment dispersed liquid A except that ultrasonic dispersion time was changed.

Then, a 50% average particle diameter D2 of an equivalent circle diameter in a longitudinal diameter (X direction)-lateral diameter (Y direction) plane of an aluminum pigment contained in each flaky pigment dispersed liquid was measured using a flow type particle image analyzer (FPIA-30005 manufactured by Sysmex Corporation). In addition, an average thickness Z was measured using a scanning transmission electron microscope (STEM, "HD-2000" manufactured by Hitachi High-Technologies Corporation). The measurement results thereof are shown in Table 1. All the aluminum pigments contained in the respective flaky pigment dispersed liquids had the maximum particle diameter of the equivalent circle diameter of equal to or less than 3 μm.

TABLE 1

| Flaky pigment dispersed liquid | 50% average particle diameter [D2 (μm)] | Average film thickness [Z (mm)] |
|---|---|---|
| A | 0.88 | 20 |
| B | 1.00 | 20 |
| C | 2.06 | 20 |
| D | 2.26 | 20 |

2.1.2. Preparation of Ink

Inks were prepared by mixing and stirring each component in ink compositions shown in the following Table 2. In this manner, inks 1 to 4 were obtained.

Here, the components represented in a shortened form and a product name in Table 2 are as follows.

DEGDEE (diethylene glycol diethyl ether, manufactured by Nippon Nyukazai Co., Ltd.)

TetEGDME (tetraethylene glycol dimethyl ether, manufactured by Nippon Nyukazai Co., Ltd.)

γbutyrolactone (γ-butyrolactone, manufactured by Kanto Chemical Co., Inc.)

Cellulose acetate butyrate (product name, manufactured by Acros Organics, cellouse resin)

BYK-UV3500 (product name, manufactured by BYK Japan KK, silicone-based surfactant)

TABLE 2

| Ink composition | | Ink 1 | Ink 2 | Ink 3 | Ink 4 |
|---|---|---|---|---|---|
| Flaky pigment dispersed liquid | A | 1.2 | | | |
| | B | | 1.2 | | |

TABLE 2-continued

| Ink composition | | Ink 1 | Ink 2 | Ink 3 | Ink 4 |
|---|---|---|---|---|---|
| (pigment solid | C | | | 1.2 | |
| content) | D | | | | 1.2 |
| Organic Solvent | DEGDEE | 73.4 | 73.4 | 73.4 | 73.4 |
| | TetEGDME | 15 | 15 | 15 | 15 |
| | γbutyrolactone | 10 | 10 | 10 | 10 |
| Resin | CAB | 0.2 | 0.2 | 0.2 | 0.2 |
| Surfactant | BYK-3500 | 0.2 | 0.2 | 0.2 | 0.2 |
| Total (% by mass) | | 100 | 100 | 100 | 100 |

2.2 Recording Apparatus

In the following evaluation tests, an ink jet printer PX-H8000 (manufactured by Seiko Epson Corp.) was modified and printers A1 to A3 ad B1 on which ink jet recording heads a1 to a3 and b1 shown in Table 3 were mounted were used. Here, the printer B1 was used for reference evaluation.

In Table 3, the "diameter" of the nozzle opening portion refers to the diameter of the cross section (circle) orthogonal to the ink discharging direction.

All of the pressure generating chambers and the ink supply paths are arranged in plural along the first direction and extends in the second direction of FIG. 2. In Table 3, the "width" of the pressure generating chamber and the ink supply path refers to a length in the first direction of FIG. 2. In addition, the "depth" of the pressure generating chamber and the ink supply path refers to a length in the second direction of FIG. 2. Moreover, the "height" of the pressure generating chamber and the ink supply path refers to a length in a third direction of FIG. 2. Here, the first direction, the second direction, and the third direction are orthogonal to each other.

In addition, the ink supply path was connected to the ink supply port in the pressure generating chamber and the cross section area of the ink supply path including the first direction and the vertical direction (third direction) and the cross section area of the ink supply port including the first direction and the vertical direction (third direction) were almost the same.

2.3. Evaluation Test

The ink cartridges of the printers A1 to A3 and B1 were filled with the inks 1 to 4 to perform the following evaluation tests.

2.3.1. Recording Availability (Discharging Stability)

Ink droplets were discharged from the nozzle of the printer and a beta pattern image was recorded on the recording medium SV-G-1270G (product name, manufactured by Roland DG Corporation, glossy polyvinyl film). Here, the printing conditions are a Duty of 100% and a printing resolution of 1440×1440 dpi.

In the specification, a "duty value" is a value calculated in the following equation.

$$\text{Duty (\%)} = \text{number of actual discharged dots}/(\text{vertical resolution} \times \text{horizontal resolution}) \times 100$$

(In the equation, "number of actually discharged dots" refers to the number of actually discharged dots per unit area, and "vertical resolution" and "horizontal resolution" respectively refer to the resolution per unit area.)

A recording availability was evaluated based on nozzle missing and a recording state of the image at this time. The evaluation standards are as follows.

A: No nozzle missing occurs and an excellent image can be recorded.

B: Nozzle missing rarely occurs and a good image can be recorded.

C: Some nozzle missing occurs and an image can be recorded.

D: Ink cannot be discharged and an image cannot be recorded.

2.3.2. Evaluation of Metallic Glossiness

Ink droplets were discharged from the nozzle of the printer and a beta pattern image was recorded on the recording medium SV-G-1270G (product name, manufactured by Roland DG Corporation). Here, the printing conditions are a Duty of 100% and a printing resolution of 1440×1440 dpi.

A 20° mirror surface glossiness and a 60° mirror surface glossiness of the obtained glitter image were measured using a gloss meter (manufactured by NIPPON DENSHOKU INDUSTRIES CO., LTD., product name "Gloss Meter VPG

TABLE 3

| | | Printer A1 | Printer A2 | Printer A3 | Printer B1 |
|---|---|---|---|---|---|
| Ink jet recording head | | Head a1 | Head a2 | Head a3 | Head b1 |
| Piezoelectric element | Vibration type | Flexural mode | Flexural mode | Flexural mode | Vertical mode |
| | Displacement amount (nm) | 500 | 500 | 500 | 670 |
| Nozzle | Nozzle density (nozzle resolution) (dpi) | 360 | 360 | 360 | 180 |
| | Nozzle opening portion diameter D1 (μm) | 22 | 22 | 22 | 25 |
| Pressure generating chamber | Material | (110) single crystal Si | (110) single crystal Si | (110) single crystal Si | (110) single crystal Si |
| | Volume [width (μm) × depth (μm) × height (μm)]($\mu m^3$) | 57.5 × 924 × 70.0 | 57.5 × 924 × 70.0 | 60.0 × 924 × 90.0 | 110 × 1050 × 80.0 |
| | Cross section area C1 [width (μm) × height (μm)]($\mu m^2$) | 4025 | 4025 | 5400 | 8800 |
| | Cross section area of ink supply port C2 [width (μm) × height (μm)]($\mu m^2$) | 24.5 × 70 | 20.0 × 70 | 19.0 × 70 | (21.5 × 80) × 2 pieces |
| Ink supply path | Number per pressure generating chamber | 1 | 1 | 1 | 2 |
| | Volume [width (μm) × depth (μm) × height (μm)]($\mu m^3$) | 24.5 × 100 × 70.0 | 20.0 × 100 × 70.0 | 19.0 × 100 × 70.0 | 21.5 × 400 × 80.0 |
| | Cross section area of ink supply path C2 [width (μm) × height (μm)]($\mu m^2$) | 1715 | 1400 | 1330 | 3440 |
| Ratio of cross section area | C1/C2 | 2.35 | 2.88 | 4.06 | 2.56 |

5000") according to JIS 28741 (1997). The evaluation of the metallic glossiness of the image was performed based on the obtained values.

The evaluation standards are as follows.

Good: A 20° mirror surface glossiness is equal to or more than 200 and a 60° mirror surface glossiness is equal to or more than 300.

Poor: A 20° mirror surface glossiness is less than 200 and/or a 60° mirror surface glossiness is less than 300.

2.3.3. Total Evaluation

It was determined whether the printers could be used as an ink jet recording apparatus based on the above test results.

The evaluation standards are as follows.

A: Usable as an ink jet recording apparatus with no problem.

B: Barely usable as an ink jet recording apparatus.

C: Not usable as an ink jet recording apparatus.

2.3.4. Evaluation Results

The following evaluation standards are shown in Table 4.

equal to or less than 30 nm, and a 50% average particle diameter of equal to or more than 0.5 μm and equal to or less than 2.1 μm could be discharged.

As described above, when the printer having the high density nozzles was used, the relationship (the above-described relationship of C1 and C2) of the cross section area of a predetermined portion in the ink flow path and the average particle diameter and the average thickness of the flaky particle contained in the used ink needed to satisfy a predetermined range to discharge the ink containing the flaky pigment.

The invention is not limited to the above-described embodiments, and various modification can be further made. For example, the invention includes the substantially same configuration (for example, the same configuration in function, method and result, or the same configuration in object and result) as the configuration described in the embodiments. Further, the invention includes a configuration in which an unessential element of the configuration described in the embodiments is replaced. Further, the invention includes a configuration having the same operating effect as the configuration described in the embodiments, or a configuration able to achieve the same object. Further, the invention includes a configuration in which a well-known technique is added to the configuration described in the embodiments.

TABLE 4

| | Used printer | C1/C2 | Used ink | Average particle diameter of flaky pigment D2 (μm) | (D2)/(Nozzle diameter) | Printing availability | Metallic gloss | 20° glossiness | 60° glossiness | Total determination |
|---|---|---|---|---|---|---|---|---|---|---|
| Comparative Example 1 | A1 | 2.35 | 4 | 2.26 | 0.103 | D | — | — | — | C |
| Example 1 | A1 | 2.35 | 3 | 2.06 | 0.094 | C | Good | 280 | 392 | B |
| Example 2 | A1 | 2.35 | 2 | 1.00 | 0.045 | B | Good | 261 | 368 | A |
| Example 3 | A1 | 2.35 | 1 | 0.88 | 0.040 | A | Good | 265 | 350 | A |
| Comparative Example 2 | A2 | 2.88 | 4 | 2.26 | 0.103 | D | — | — | — | C |
| Example 4 | A2 | 2.88 | 2 | 1.00 | 0.045 | C | Good | 251 | 362 | B |
| Example 5 | A2 | 2.88 | 1 | 0.88 | 0.040 | B | Good | 253 | 350 | A |
| Comparative Example 3 | A3 | 4.06 | 4 | 2.26 | 0.103 | D | — | — | — | C |
| Comparative Example 4 | A3 | 4.06 | 3 | 2.06 | 0.094 | D | — | — | — | C |
| Comparative Example 5 | A3 | 4.06 | 2 | 1.00 | 0.045 | D | — | — | — | C |
| Comparative Example 6 | A3 | 4.06 | 1 | 0.88 | 0.040 | D | — | — | — | C |
| Reference Example 1 | B1 | 2.56 | 4 | 2.26 | 0.090 | B | Good | 282 | 382 | A |
| Reference Example 2 | B1 | 2.56 | 3 | 2.06 | 0.082 | B | Good | 276 | 388 | A |
| Reference Example 3 | B1 | 2.56 | 2 | 1.00 | 0.040 | B | Good | 255 | 371 | A |
| Reference Example 4 | B1 | 2.56 | 1 | 0.88 | 0.035 | B | Good | 235 | 357 | A |

In both the printers A1 and A2 in Examples 1 to 5, the cross section area (C1) of the pressure generating chamber is more than once and equal to or less than 3.5 times the cross section area (C2) of the ink supply port. When the printers were used, the ink containing the flaky pigment having an average thickness of equal to or more than 10 nm and equal to or less than 30 nm, and a 50% average diameter of equal to or more than 0.5 μm and equal to or less than 2.1 μm could be discharged.

On the other hand, in the printers A1 and A2 in Comparative Examples 1 and 2, the cross section area (C1) of the pressure generating chamber is more than once and equal to or less than 3.5 times the cross section area (C2) of the ink supply port. However, even when the printers were used, the ink containing the flaky pigment having a 50% average particle diameter of more than 2.1 μm could not be discharged.

In the printer A3 used in Comparative Examples 3 to 6, the cross section area (C1) of the pressure generating chamber is more than 3.5 times the cross section area (C2) of the ink supply port. Thus, the ink containing the flaky pigment having an average thickness of equal to or more than 10 nm and

What is claimed is:

1. A recording apparatus comprising:

an ink jet recording head, wherein a manifold extending through a protection substrate and a flow path forming substrate and having a reservoir and a communication chamber in which an ink flows, and a plurality of ink flow paths divided from the manifold and arranged in a first direction are formed in the ink jet recording head, the reservoir, communication chamber and the ink flow paths having one dimension that is the same;

a nozzle opening portion which discharges the ink flowing from the manifold is formed in the ink flow path;

wherein a nozzle number for the nozzle opening portion is equal to or more than 360 openings per inch, when a maximum area is Cl and a minimum area is C2 in a cross section of the ink flow path including the first direction and a vertical direction, except a cross section including the nozzle opening portion, the Cl is more than once and equal to or less than 3.5 times the C2;

a length of the longest line segment is equal to or more than 30 μm and equal to or less than 80 μm among the line segments parallel to the first direction in the cross section of the ink flow path including the first direction and the vertical direction;

the ink contains a flaky pigment; and the flaky pigment has an average thickness of equal to or more than 5 nm and equal to or less than 20 nm and a 50% average particle diameter of an equivalent circle diameter of equal to or more than 0.5 #m and equal to or less than 2.1 μm.

2. The recording apparatus according to claim 1, wherein ink supply paths which respectively communicate with the manifold and pressure generating are formed in the plurality of the ink flow paths, and the number of the ink supply paths corresponding to the pressure generating chamber is one.

3. The recording apparatus according to claim 1, wherein the maximum particle diameter of the equivalent circle diameter of the flaky pigment is equal to or less than 3 μm.

4. The recording apparatus according to claim 1, wherein when the equivalent circle diameter of the cross section of the nozzle opening portion orthogonal to an ink discharging direction is D1, and the 50% average particle diameter of the equivalent circle diameter of the flaky pigment is D2, D2 is equal to or less than 0.1 time D1.

5. The recording apparatus according to claim 1, wherein a discharging rate of the ink droplets discharged from the nozzle opening portion is equal to or more than 6 m/second.

6. The recording apparatus according to claim 1, wherein vertical a resolution of the ink jet recording head is equal to or more than 300 dpi.

7. The recording apparatus according to claim 1, wherein a piezoelectric actuator which has a vibration plate and a piezoelectric element is formed in the ink jet recording head.

8. The recording apparatus according to claim 7, wherein the piezoelectric element is deformed in a flexural vibration manner.

9. A recorded matter which is obtained using the recording apparatus according to claim 1.

10. A recorded matter which is obtained using the recording apparatus according to claim 2.

11. A recorded matter which is obtained using the recording apparatus according to claim 3.

12. A recorded matter which is obtained using the recording apparatus according to claim 4.

13. A recorded matter which is obtained using the recording apparatus according to claim 5.

14. A recorded matter which is obtained using the recording apparatus according to claim 6.

15. A recorded matter which is obtained using the recording apparatus according to claim 7.

16. A recorded matter which is obtained using the recording apparatus according to claim 8.

* * * * *